United States Patent
Bindels et al.

[11] Patent Number: 6,059,646
[45] Date of Patent: May 9, 2000

[54] APPARATUS FOR PORTIONING FOOD

[75] Inventors: Johannes P. J. Bindels, St. Anthonis; Gerardus F. J. Leenen, Bergen, both of Netherlands

[73] Assignee: Stork MPS B.V., Netherlands

[21] Appl. No.: 08/989,644

[22] Filed: Dec. 12, 1997

[30] Foreign Application Priority Data

Dec. 13, 1996 [NL] Netherlands ............................ 1004765

[51] Int. Cl.⁷ ................................................... A22C 11/02
[52] U.S. Cl. .................................. 452/29; 452/31; 452/48
[58] Field of Search .................................. 452/29, 31, 48

[56] References Cited

U.S. PATENT DOCUMENTS

| | | |
|---|---|---|
| 3,480,449 | 11/1969 | Sumption . |
| 3,716,891 | 2/1973 | Demarest .................................. 452/31 |
| 4,417,434 | 11/1983 | Piereder . |
| 4,565,054 | 1/1986 | Piereder . |
| 4,709,450 | 12/1987 | Stanley et al. . |
| 5,083,970 | 1/1992 | Reutter ...................................... 452/31 |
| 5,131,884 | 7/1992 | Melanson et al. ........................ 452/29 |

*Primary Examiner*—Willis Little
*Attorney, Agent, or Firm*—Banner & Witcoff, Ltd.

[57] ABSTRACT

The invention relates to an apparatus for portioning a food mass, comprising: a path to be traversed by the food mass which is connected on one side to a feed device for feeding the food mass for portioning; a cutting device incorporated in the path for severing the food mass situated in the path; and a channel incorporated in the path which is connected to the feed device at its feed end and which is open at its other end, wherein control means are arranged in order to control the feed means and the cutting device such that the distance between successive cuts made in the food mass is adjustable. The invention further relates to a cutting device for severing a food mass situated in a channel, comprising a cutting blade which extends substantially perpendicularly of the axis of the channel and which is movable substantially parallel to itself, wherein the cutting blade is formed by a plate provided with at least one hole.

11 Claims, 3 Drawing Sheets

APPARATUS FOR PORTIONING FOOD

SUMMARY OF THE INVENTION

The invention relates to an apparatus for portioning a food mass, comprising:

a path to be traversed by the food mass which is connected on one side to a feed device for feeding the food mass for portioning;

a cutting device incorporated in the path for severing the food mass situated in the path; and a channel incorporated in the path which is connected to the feed device at its feed end and which is open at its other end.

BACKGROUND OF THE INVENTION

Such an apparatus is known from U.S. Pat. No. 4,417,434.

This apparatus of the prior art is used to encase a meat mass for purpose of producing sausages. In this apparatus the feed means are formed by a pump and the channel is formed by a telescopic tube system. Displacement of the meat mass through the channel takes place by a combined action of a pump and telescopic tube system. Fixed to the tube system is a cutting device which makes a cut through the meat mass. During a return stroke of the telescopic tube the casing is filled with meat mass. At the end of the return stroke the clamping device fixed to the telescopic tube is situated at the location of the cut, where the clamping device arranges a clamp or clamps without being obstructed by sinews or other tough pieces of meat mass, thus forming a front and rear part of a sausage.

A number of drawbacks is associated with this apparatus. The size of the portions is determined by the stroke length of the telescopic tube as well as by the diameter of the telescopic tube. Modification of at least one of the two parameters is necessary in order to adapt the size of the portions. This requires a complex conversion of the apparatus involving considerable cost, particularly due to loss of production capacity. For this reason it is not possible to portion portions of different sizes in a flexible manner. The need herefor is however becoming ever greater.

BRIEF DESCRIPTION OF THE INVENTION

The invention now has for its object to provide a solution for the specified drawback.

For this purpose the apparatus according to the invention is also provided with control means which are arranged in order to control the feed means and the cutting device such that the distance between successive cuts made in the food mass is adjustable.

As a result of these measures a more accurate portioning can take place, also in the case of variable portions. This also applies to meat parts with components which are difficult to separate, for instance ham.

The necessary reciprocal movement of the telescopic tube system entails relatively long transport times. The possibilities of speeding up these transport times are limited in respect of the mechanical load caused by the mass inertia of the cutting and clamping device mounted on the tube system and in respect of safety requirements. The production capacity is hereby limited. The apparatus is moreover of complex construction, in particular due to the telescopic tube system and the cutting and clamping device moving therewith, which has a negative effect on the cost price and the reliability of the apparatus. The telescopic tube system also increases the risk of accumulations of contaminants whereby the tube system must be provided with seals and high demands are made of the frequency and quality of the cleaning of the tube system.

For this purpose the channel is arranged in stationary position according to a preferred embodiment of the invention.

According to another preferred embodiment the feed device has an adjustable feed rate. This results in an even better and more precise portioning option, in that flow profiles in the meat mass can be adjusted in a controlled manner.

According to another preferred embodiment an encasing device is arranged along the path downstream of the cutting device for arranging a casing round the portioned food mass. It will be apparent that this is important in the first instance for making a casing round types of sausage, for which use can be made of an encasing device for making an already existing casing, for instance of natural skin, or for which use can be made of a so-called co-extrusion device which produces a more or less rigid casing from a plastic material. An encasing device is understood to include not only the arrangement of a casing in the above stated sense, but also the arranging of a casing in the form of for instance a can around larger pieces of meat, such as in the canning of ham or pieces of ham. It also occurs that pieces of ham are packed in a casing of plastic foil. The word encasing includes all of these concepts.

According to yet another preferred embodiment a crimping device is arranged downstream of the encasing device for crimping food mass, for instance in manufacturing standard sausage types.

According to yet another preferred embodiment a clamping device is arranged on the path downstream of or coinciding with the crimping device for arranging a clamp on the crimp arranged by the crimping device, for instance for manufacturing liver sausage. Two clamps are then usually arranged simultaneously, i.e. one clamp to make a closure of the previous sausage and another clamp to make a closure at the beginning of the subsequent sausage.

It will be apparent that it is attractive to control the control device of the crimping device such that it engages on each cut made by the cutting device. The crimping device is hereby no longer required to exert great forces, since the relevant position is already precut.

The measures according to claim 8 can be of importance for the making of sausages with a short length.

Often it is required that the portions of food mass have the same weight, the same length or another same property instead of a same volume.

Therefore, according to a preferred embodiment the present invention provides an apparatus, comprising means for determination of said property of the food mass, the means being positioned after the channel, and in which the control means are adapted co control the cutting apparatus also in dependence of said property.

These features lead to a feed back loop, which provides that after the determination of the property of the first portion a correction factor is determined and the volume of the following portions is corrected with this factor.

When one departs from the predetermination that the relation between the measured property and the volume stays constant, no further feed back is necessary.

According to another preferred embodiment the control means comprise a memory which is adapted to store the value of the property and a calculator for calculating the correction factor from said value.

The present invention also relates to a cutting device for severing a food mass situated in a channel, comprising a cutting blade which extends substantially perpendicularly of the axis of the channel and which is movable substantially parallel to itself, wherein the cutting blade is formed by a plate provided with at least one hole. This results in a particularly attractive embodiment of such a cutting device because, except for the situation where the hole in the plate coincides with the channel, the channel is closed off; such a cutting device therefore also fulfills the function of closing valve.

This dual role is manifested particularly when it is applied in an apparatus forming a combination of at least one of the apparatuses according to the claims 1–8, wherein the combination apparatus comprises only a single feed device onto which the paths of the different apparatus are connected. This is particularly attractive because the meat mass pump usually applied in the feed devices represents an expensive component and is not in constant use when only a single portioning apparatus is arranged thereon. With several portioning apparatuses it is possible to make the duty cycle of this expensive pump as long as possible, wherein the cutting devices arranged on the diverse apparatuses are controlled such that they alternately take off a part of the mass for portioning.

It will be apparent that this is possible with two or more of such apparatuses connected onto a joint feed device.

Such a situation is attractive in a combination which is characterized in that a cutting device according to any of the claims 9–11 is arranged in each of the apparatuses and the cutting device are controllable such that one of the cutting devices is opened alternately.

Finally, the invention further relates to a method for portioning a food mass, comprising the following steps of:
carrying the food mass into a channel; and
cutting the food mass situated in the channel;
wherein cutting and carrying of the food mass into the channel takes place such that the portioned pieces of food mass have the desired length.

It will be apparent that in this method the advantages relating to flexibility and reliability of the apparatus as stated in claim 1 are likewise manifested.

The same consideration applies for the method according to claim 15, wherein carrying of a food mass into the channel takes place with a controllable feed device and cutting into portions takes place with a controllable cutting device, and wherein the control of each of the devices is performed such that the food mass is divided into portions with an adjustable length.

Other advantageous preferred embodiments can be found in the remaining claims.

BRIEF DESCRIPTION OF THE DRAWINGS

The invention will be elucidated hereinbelow with reference to the annexed figures, in which.

DETAILED DESCRIPTION OF THE INVENTION

Figure 1:
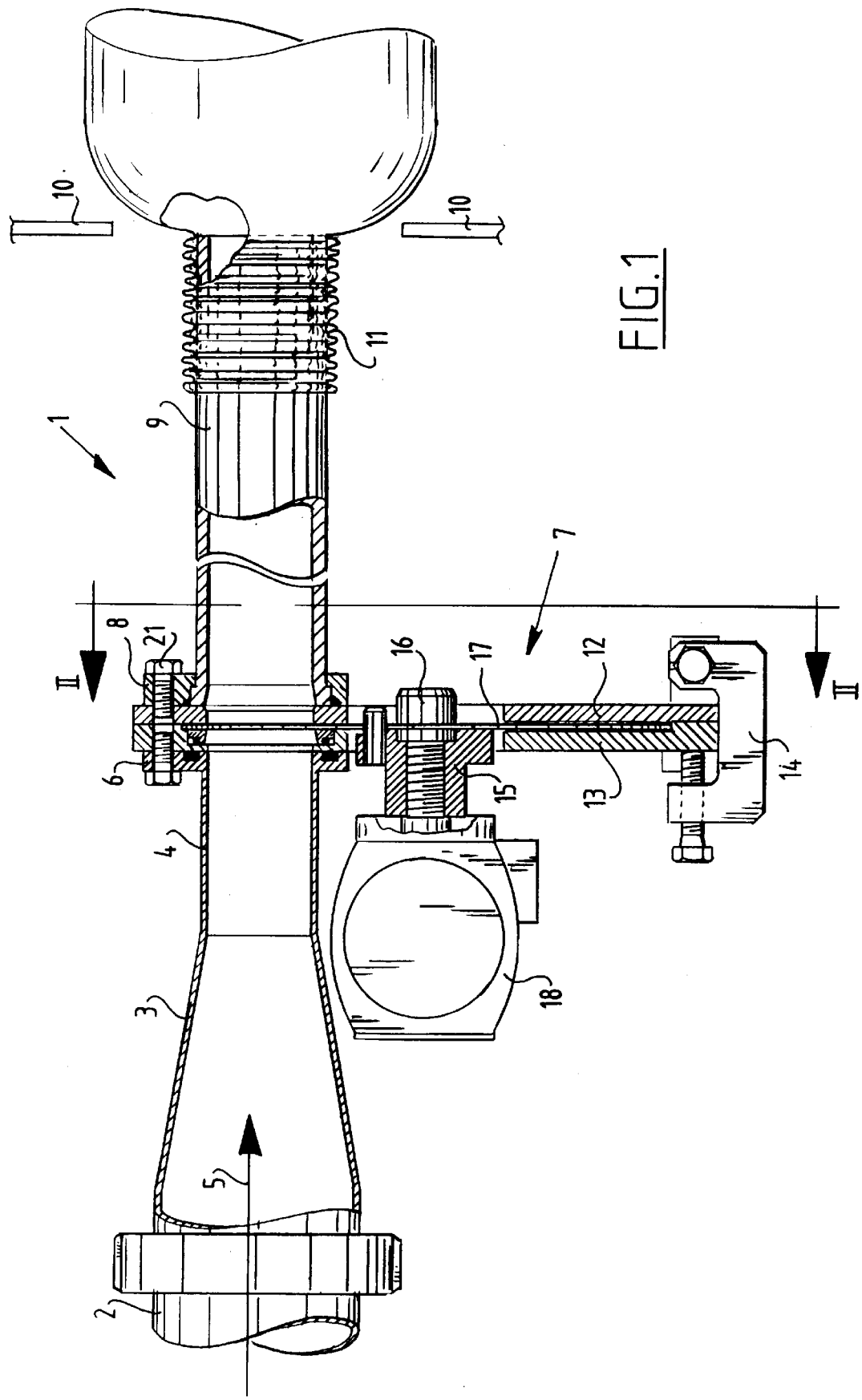
FIG. 1 shows a partly schematic view in lengthwise section of an apparatus according to the invention.

Shown in FIG. 1 is a cube designated as a whole with 1, which is formed by a cylindrical part 2, a conical part 3 and a cylindrical part 4 of smaller diameter. These tube pieces 2,3,4 are together fixedly mounted on a feed device (not shown in the drawing) for feeding meat mass through tube 2,3,4 in the direction of arrow 5.

The tube piece 4 is connected to a flange 6 on which is mounted the cutting device, designated as a whole with 7. Further arranged opposite flange 6 is a flange 8 which is connected to a tube piece 9, which is connected at its free end to an only schematically designated crimping and clamping device 10.

It is further noted that crimping and clamping devices are known in the art; reference is herein made to U.S. Pat. No. 4,417,434.

Encasing material 11 is arranged in pressed together in concertina form around the tube 9.

For arranging the encasing material a separate device is arranged which is not shown in the drawing. This can be formed by an extrusion device, so that the casing 11 is extruded round the meat mass leaving the free end of tube 9, although it can likewise be formed by a device which intermittently, i.e. after the crimping and removal of an encased meat mass unit, arranges a new quantity of casing 11 around tube 9.

Figure 2:
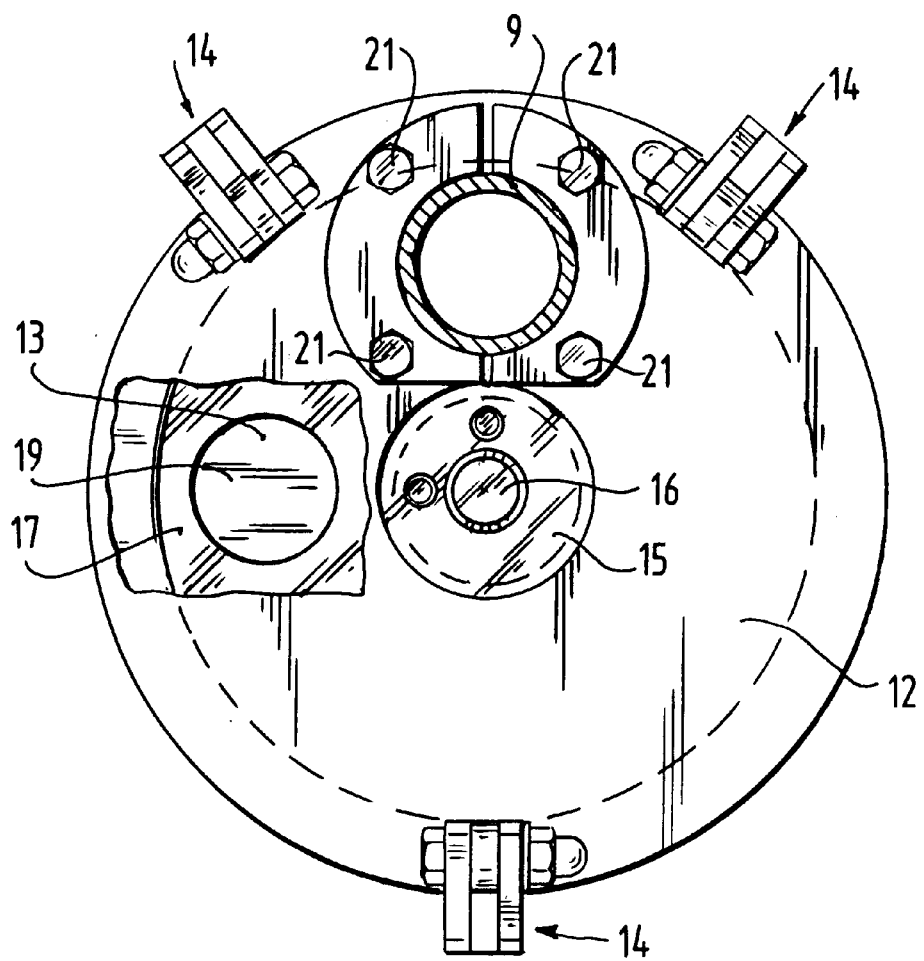
FIG. 2 shows a cross-sectional view along the line II—II in FIG. 1.

The construction of the cutting device, which is shown in FIG. 2 along the lines II—II in FIG. 1, will now be discussed.

The cutting device 7 is formed essentially from a housing which consists of two plates 12,13 and which is connected by means of bolts 21 to flanges 6,8. On the other side the plates 12,13 are mutually connected by a clamping device 14.

Mounted in plates 12,13 by means of a bearing 15 is a shaft 16, on which a knife blade 17 is fixed. On the other side the shaft 16 is connected to a motor 18. This motor can be formed by an electric motor, a hydromotor or a pneumatically driven motor, depending on the technique further used in the apparatus in question.

Knife blade 17 is provided with two holes, only one of which is shown, namely 19. Knife blade 17 is driven in rotation such that both holes 19 of knife blade 17 are placed alternately in alignment with tube 1. During the relevant movement the knife blade 17 performs a cutting movement.

The sequence of operations will subsequently be elucidated with reference to FIGS. 3a–e.

Figure 3A:
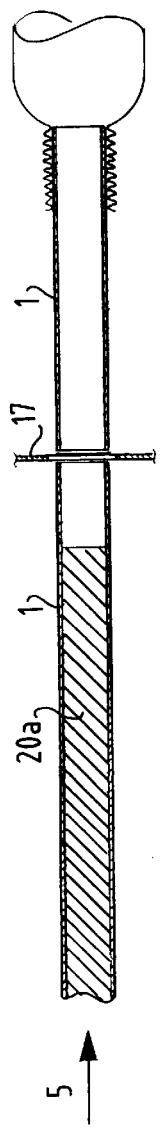
FIG. 3a–e show schematic views in lengthwise section of the apparatus in diverse stages.
Figure 3B:
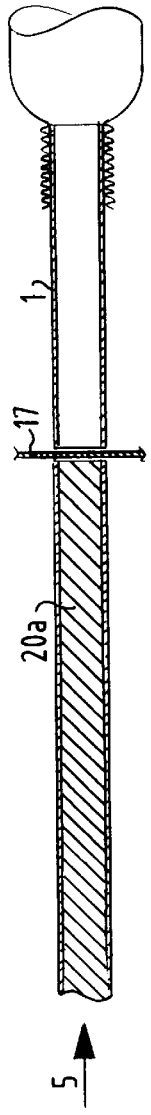

As shown in FIG. 3a, a quantity of meat mass 20 is fed from the meat mass feed device in the direction of arrow 5, passing through tube 1 as far as knife blade 17, as shown in FIG. 3a. This movement is continued until meat mass 20 has reached knife blade 17. The knife blade 17 then executes a cutting movement in order to cut off the meat mass; when the machine is set into operation this is essentially superfluous. The operation is only shown for the sake of clarity.

Knife blade 17 thereafter rotates further until the other aperture 19 of knife blade 17 lies in alignment with the tube 1. The meat feed device is controlled such that the meat mass is pushed further along.

Figure 3C:
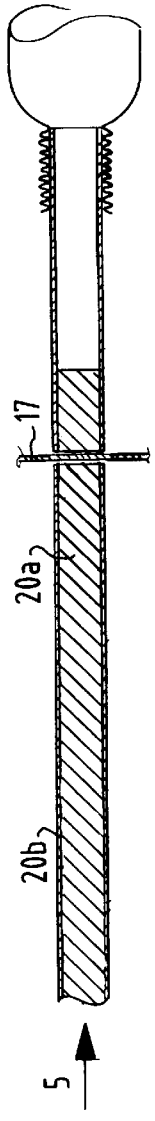

This situation is shown in FIG. 3c. The movement is continued until meat mass 20a is situated in the space between knife blade 17 and the crimping and clamping device 10, whereafter the crimping and clamping device 10 is activated and crimps the meat mass and clamps the casing closed. A clamp is herein arranged round the casing at the position of the constriction.

Figure 3D:
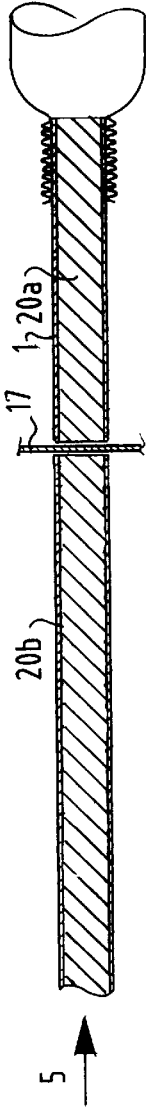
Figure 3E:
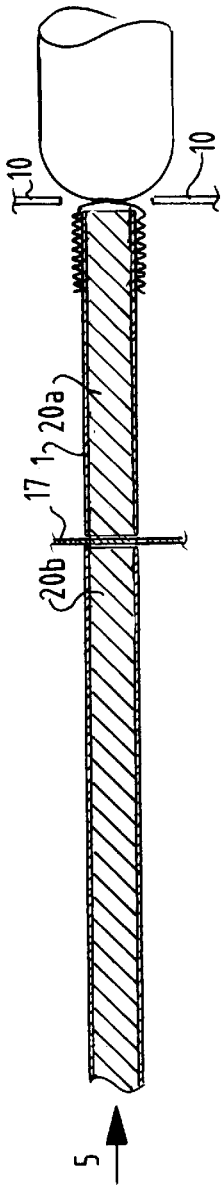

As shown in FIG. 3d, the knife 17 is subsequently re-activated and this knife makes a cut between the meat mass 20*a* and the following meat mass 20*b*, whereafter the whole cycle is continued.

It is noted herein that in the drawn embodiment the length of the pieces of meat mass is always the same as the longitudinal distance between knife 17 and the crimping and clamping device 10. This is the result of the fact that the cutting, crimping and clamping operations take place simultaneously.

It is however equally possible to cause these actions not to take place simultaneously, whereby it becomes possible to make the length of the pieces of meat mass 20*a* shorter or longer than the distance between knife 17 and crimping and clamping device 10.

When for instance shorter pieces of meat mass are made, the apparatus will be controlled such that once the desired length of meat mass has passed through knife 17, the knife is actuated again. The crimping and clamping device will have to be controlled synchronously and subject to the adjusted length.

According to an embodiment not depicted in the drawing the tube 9 is followed by a balance for measuring the weight of the first portion flowing from the tube. The signal from the balance is conducted to the calculator which is not depicted in the drawings and which besides comprises a memory. In the memory the signal is compared with the required value and a correction factor is determined with which the portion volume of the apparatus is amended.

It will be clear that instead of the weight other properties can be measured like the length.

It will also be clear that these actions can, at least partially, also be executed by a person; herein the result of the weighing is entered by means of a key board and subsequently converted to a correction factor by the calculator.

It will be apparent that diverse modifications can be made to the apparatus shown without deviating from the invention.

What is claimed is:

1. Apparatus for portioning a food mass, comprising:
    a tube to be traversed by the food mass which is connected on one side to a feed device for feeding the food mass and which is open at its other end;
    a cutting device incorporated in the tube intermediate said one side and said open end for severing the food mass situated in the tube into portions;
    an encasing device arranged at the open end of the tube downstream of the cutting device for arranging a casing round the portioned food mass; and
    a crimping device for crimping the food mass arranged downstream of the encasing device.

2. Apparatus as claimed in claim 1 wherein the tube is arranged in stationary position.

3. Apparatus as claimed in claim 1 wherein the feed device has an adjustable feed rate.

4. Apparatus as claimed in claim 1 wherein a clamping device is arranged downstream of, or coinciding with, the crimping device for arranging a clamp on the crimp provided by the crimping device.

5. Apparatus according to claim 1 wherein the cutting device comprises a cutting blade which extends substantially perpendicularly of the axis of the tube and which is movable substantially parallel to itself, wherein the cutting blade is formed by a plate provided with at least one hole provided with a cutting edge.

6. Apparatus as claimed in claim 5 wherein the at least one hole is rotatable around a shaft extending substantially parallel to the tube axis.

7. Apparatus as claimed in claim 5 wherein the cutting blade is provided with at least one hole which can be placed into alignment with the tube and that the diameter of the hole is at least as large as the internal diameter of the tube.

8. Combination of at least two apparatuses as claimed in claim 1 wherein the combination comprises only a single feed device onto which the tubes of the diverse apparatuses are connected.

9. Combination as claimed in claim 8 wherein said cutting device is arranged in each of the apparatuses and the cutting devices are controllable such that one of the cutting devices is opened in alternating manner.

10. Method for portioning a food mass, comprising:
    supplying the food mass into a tube connected on one side to a feed device for feeding the food mass and which is open at its other end;
    severing the food mass situated in the tube into portions by a cutting device incorporated in the tube;
    encasing the portions by an encasing device arranged at the open end of the tube downstream of the cutting device and
    crimping the encased portions at the locations where the food mass was previously severed.

11. Method as claimed in claim 10 further comprising clamping the encased portions where the food mass was previously crimped.

* * * * *